United States Patent [19]

Burroughs

[11] 4,175,895
[45] Nov. 27, 1979

[54] TUBING REAMER

[76] Inventor: H. Willard Burroughs, 225 Country Club Dr., D 142, Largo, Fla. 33541

[21] Appl. No.: 899,327

[22] Filed: Apr. 24, 1978

[51] Int. Cl.² .............................................. B23D 79/08
[52] U.S. Cl. ....................................... 408/228; 30/172
[58] Field of Search .................. 30/172; 408/211, 228, 408/227, 226

[56] References Cited

U.S. PATENT DOCUMENTS

| 3,990,806 | 11/1976 | Meyers | 30/172 X |
|---|---|---|---|
| 4,076,446 | 2/1978 | Lindstaedt | 408/227 |

Primary Examiner—Jimmy C. Peters
Attorney, Agent, or Firm—Stein & Frijouf

[57] ABSTRACT

A device for finishing the end of a tubing is disclosed comprising a first and a second member. The first member has a first base and first end walls extending from each of two opposed ends of the first base. A plurality of first V-shaped grooves extend into each of the first end walls. The second member has a second base and second end walls extending from each of two opposed ends of the second base. A plurality of second V-shaped grooves extend into each of the second end walls. Apertures extend into the first and second bases enabling a threaded fastener to adjustably secure the first and second members relative to one another. The first member finishes the inside and outside tubing surface with two separate inside and outside cutting edges while the second member simultaneously finishes the inside and outside tubing surface with two separate inside and outside cutting edges upon rotation of the device relative to the tubing. The foregoing abstract is merely a resume of one general application, is not a complete discussion of all principles of operation or applications, and is not to be construed as a limitation on the scope of the claimed subject matter.

13 Claims, 9 Drawing Figures

TUBING REAMER

BACKGROUND OF THE INVENTION

1. Field of the Invention

This invention relates to cutting and more particularly to cutting by rotating an axially moving tool with inverse cutting edges.

2. Description of the Prior Art

Various types of tubing reamers and the like have been devised in the prior art for finishing the end of a tubing to remove unwanted burrs caused by the cutting of the tubing by conventional means. In general, a tubing is cut by a serrated cutting edge leaving a burr on the inside and the outside tubing surface at the end of the tubing. Primative tools such as files, knives and scrapers have been used for removing the burrs from the inside and outside tubing surfaces. Others in the prior art have developed tools which simultaneously finish the inside tubing surface and the outside tubing surface upon rotation of the tool relative to the tubing. In general, the tubing used in the prior art was a hard metallic tubing thereby necessitating the use of hardened cutting edges and rigid construction in order to remove the burrs from the tubing end. Various types of devices were developed to meet the needs of various applications, types, sizes and tubing materials. Many of these devices were overly complex, expensive and required frequent sharpening and maintenance.

One of the more recent improvements in the tubing art has produced plastic pipe, such as polystyrene, ABS plastic and the like. These tubings have found wide application in chemical processes, industrial plants, machines, and residential and commercial plumbing systems. Among the major advantages of plastic pipe is the non-corrosiveness of the tubing as well as the ease of construction and joining of the tubing sections. In general, the tubing is first cut with a saw, such as a hacksaw or a bandsaw. The tubing ends are then reamed to remove the burrs and the plastic pipe is cemented together through a connector joint or the like. Since the plastic pipe is relatively soft compared to the metallic pipe, plastic tubing reamers do not require the hardened cutting edges as do reamers for metallic tubing. In spite of this, the prior art has failed to develop a tubing reamer which is specifically designed for reaming the terminal end and the inside and outside tubing surfaces of a plastic tube. Accordingly, there is a need in the prior art for a tubing reamer specifically adapted for quickly and efficiently reaming of the terminal end including the inside and outside surfaces of the plastic tubing. The device should be a relatively simple and inexpensive device which is adaptable to the wide variety of standard size plastic tubings now available in the art. The device should also be able to accommodate for metric dimensioned tubing which will be forthcoming in the future. The device must also be safe for use and in compliance with safety standards promolgated for the piping trade.

Therefore it is an object of this invention to provide an apparatus which overcomes the aforementioned inadequacies of the prior art and provides an improvement which is a significant contribution to the advancement of the tubing art.

Another object of this invention is to provide a device for finishing the end of a tubing comprising a first and a second member each having a V-shaped groove and connected relative to one another for enabling each of the first and second members to simultaneously finish the inside and outside tubing surfaces upon rotation of the unit relative to the tubing.

Another object of this invention is to provide a device for finishing the end of a tubing comprising a first and a second member each having a substantially U-shaped cross-section with plural end walls each having a V-shaped groove wherein the first member finishes the inside and outside tubing surface with two separate inside cutting edges and two separate outside cutting edges while the second member simultaneously finishes the inside and the outside tubing surface with two separate inside cutting edges and two separate outside cutting edges upon rotation of the device relative to the tubing.

Another object of this invention is to provide a device for finishing the end of a tubing wherein each of the first and second members comprises a plurality of grooves spaced along the longitudinal length of the first and second members with the first and second members being adjustably securable to one another for accommodating a large variety of tubing diameters.

Another object of this invention is to provide a device for finishing the end of a tubing wherein each of the first and second members are formed from an integral stamped metal piece and are bent to have a U-shaped cross-section.

Another object of this inventions is to provide a device for finishing the end of tubing comprising a first and a second member each having a plurality of grooves extending into end walls of the first and second members wherein each of the grooves defines an inside cutting edge and an outside cutting edge thereby eliminating the need for exposed or extended blades or cutting surfaces.

Another object of this invention is to provide a device for finishing the end of a tubing comprising a first and a second member each having a V-shaped groove wherein the V-shaped groove accommodates for various tubing wall thicknesses and wherein the first and second members are adjustably securable to one another for simultaneously accommodating for various tubing diameters.

Other objects and a fuller understanding of this invention may be had by referring to the summary of the invention, the description and the claims, taken in conjunction with the accompanying drawings.

SUMMARY OF THE INVENTION

The invention may be incorporated into a device for finishing the end of a tubing wherein the tubing has an inside tubing surface and an outside tubing surface. The device as disclosed is suitable for use with soft tubing such as plastic or synthetic tubing but it should be understood that the principle involved herein is equally adaptable to metallic tubing such as steel, copper or aluminum and the like with appropriate tempering of the cutting surfaces. The device in its preferred form comprises a first member having first groove means defining an inside cutting edge and an outside cutting edge. A second member has second groove means for defining an inside cutting edge and an outside cutting edge in a manner similar to the first member. Connecting means adjustably connect the first member to the second member enabling the inside and outside cutting edges of the first and second members to respectively finish the inside and the outside tubing surfaces of the tubing end upon rotation of the first and second members relative to the tubing.

In a more specific embodiment, the invention comprises the first member having a generally U-shaped cross-section including a first base and first end walls extending substantially perpendicular to the first base from each of two opposed ends of the first base. A plurality of first grooves extend into each of the first end walls and are spaced along the longitudinal length of the first member. Each of the first grooves include the inside and outside cutting edges with the grooves of the first end walls being aligned relative to one another and the longitudinal dimension of the first member. The second member in similar fashion, has a generally U-shaped cross-section comprising a second base and second end walls extending substantially perpendicular to the second base from each of two opposed ends of the second base. A plurality of second grooves extend into each of the second end walls and are spaced along the longitudinal length of the second member. The second grooves comprise inside and the outside cutting edges with the grooves of the second walls being aligned relative to one another and are spaced along the longitudinal dimension of the second member. The grooves may comprise V-shaped grooves with the inside and outside cutting edges being the sides with the V-shaped grooves.

The U-shaped second member is receivable within the U-shaped first member enabling the first base and the first end walls to slidably contact the second base and the second end walls, respectively. Apertures extend through the first and second bases of the first and second members for receiving threaded fastening means. In a preferred form, the apertures in the first and second bases comprise slots extending along the longitudinal length of the first and second members, respectively, forming a through aperture in both the first and second members for receiving the threaded fastener. The threaded fastener extends through the apertures to adjustably connect the first member to the second member, making a rigid device. Interconnection of the first and second members enables the first member to finish the inside and the outside tubing surfaces with two separate inside cutting edges and two separate outside cutting edges while simultaneously the second member finishes the inside and the outside tubing surfaces with two separate inside cutting edges and two separate outside cutting edges. The V-shaped grooves enable the inside and outside cutting edges to adapt to various tubing wall thicknesses whereas the adjustable the first and second members enable the device to adapt to various diameter tubing.

In a more specific form of the invention, each of the first and second members comprise an integral metallic stamping which is bent at the terminal ends of the base for creating the end walls and the substantially U-shaped cross-section. The second member is preferably smaller in size than the first member, enabling the second member to be received within the U-shaped interior of the first member. The first end walls may extend only partially along the longitudinal dimension of the first member and similiarly the second walls may extend only partially along the longitudinal dimension of the second member. The first and second slots in the first and second bases are located adjacent the area of the first and second members void of the first and second end walls, respectively.

This invention accordingly comprises an apparatus possessing the features, properties and the relation of elements which will be exemplified in the device hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
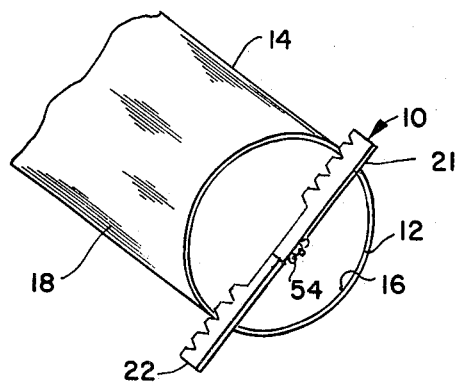
FIG. 1 is an isometric view of the novel device finishing the end of a tubing.
Figure 2:
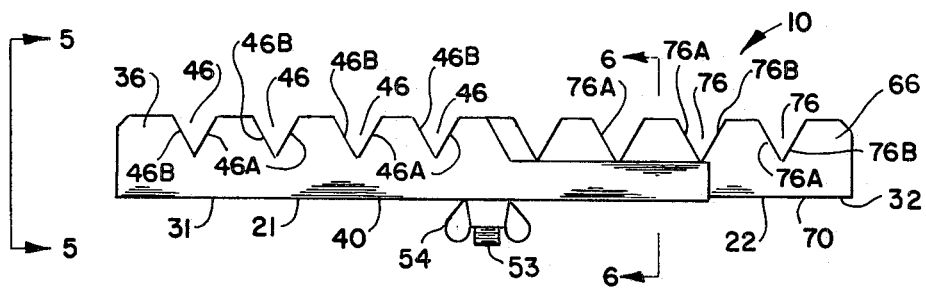
FIG. 2 is a side elevational view of the device shown in FIG. 1.
Figure 3:
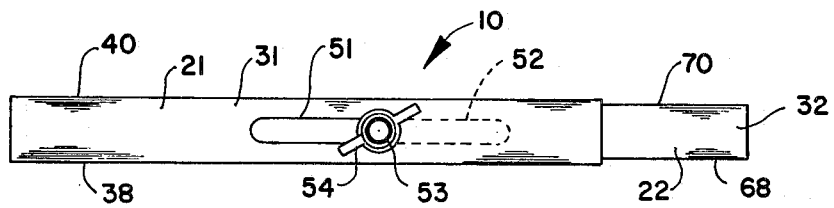
FIG. 3 is a bottom elevational view of the device shown in FIG. 2.
Figure 4:
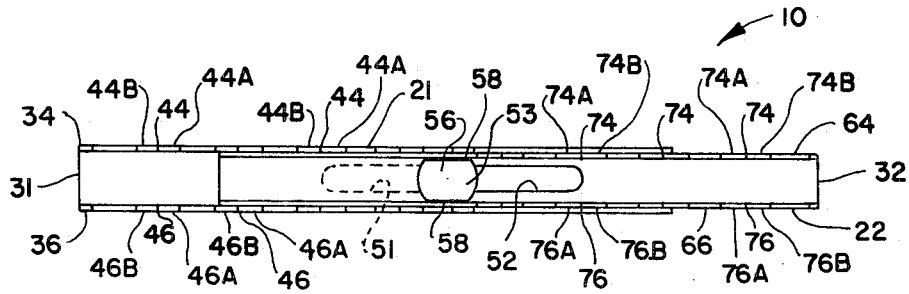
FIG. 4 is a top elevational view of the device shown in FIG. 2.
Figure 5:
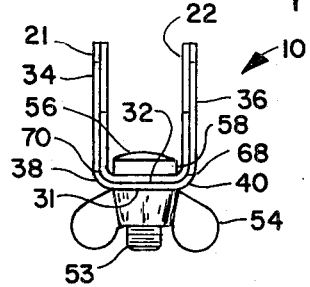
FIG. 5 is an end elevational view along line 5—5 of the device shown in FIG. 2.
Figure 6:
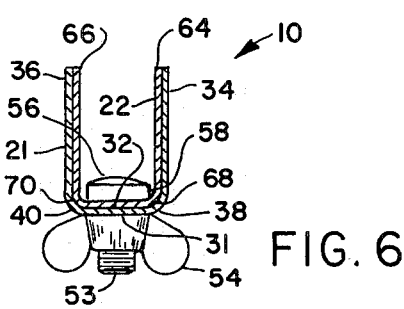
FIG. 6 is a sectional view along line 6—6 of the device shown in FIG. 2.

FIGS. 1-9 illustrate a device 10 for finishing the end 12 of a tubing 14 having an inside tubing surface 16 and an outside tubing surface 18. In this embodiment, the tubing 14 represents a plastic or synthetic tubing made of polyvinyl chloride, ABS plastic or another plastic or synthetic pipes. In addition, the tubing 14 may represent a metallic tubing such as aluminum, copper or the like which is equally applicable to the device 10 when incorporating appropriate cutting edges.

The device 10 comprises a first member 21 and a second member 22 having a first and a second base 31 and 32, respectively. The first member 21 has first end walls 34 and 36 extending substantially perpendicular to the first base 31 from each of two opposed edges of the first base 31. The first end walls 34 and 36 are substantially parallel to one another and may be formed integrally with the first base 31 by bends 38 and 40.

The first member 21 also comprises a plurality of first grooves 44 in first end wall 34 and a plurality of first grooves 46 in first end wall 36. Each of the grooves 44 and 46 are substantially V-shaped having inside cutting edges 44A and 46A and outside cutting edges 44B and 46B, respectively. The first grooves 44 and 46 are spaced longitudinally along the first member 21 and are aligned with one another with the alignment being transverse to the major longitudinal dimension of the first member 21. The grooves 44 and 46 may be stamped in the first member 21 prior to forming bends 38 and 40 and optionally sharpened after the bending process. In general, it has been learned that an integral device stamped from 1/32 inch galvanized cold rolled steel requires no sharpening for use with plastic or synthetic pipe.

The first end walls 34 and 36 extend only partially along the major longitudinal dimension of the first member 21. A first aperture shown as a slot 51 extends through the first base 31 of the first member 21 for receiving a threaded fastener shown as a machine screw 53 and a wing nut 54. The machine screw 53 has a head 56 having flats 58 shown more clearly in FIGS. 4–6 which engage second end walls 64 and 66 of the second member 22. This engagement eliminates rotation of screw 53 relative to the second member 22. The second end walls 64 and 66 extend substantially perpendicular to the second base 32 forming a generally U-shaped second member 22 in a manner similar to the generally U-shaped first member 21. It should be realized that the dimensions of the second member 22 are smaller than the first member 21 enabling the first and second bases 31 and 32 and the first end walls 34 and 36 and the second end walls 64 and 66 to mutually and slidably contact one another upon assembly as shown in FIGS. 2–6.

The second member 22 may also be fabricated from a single piece of galvanized steel or similar material with the second end walls 64 and 66 formed by bends 68 and 70. The second member 22 includes second grooves 74 and 76 which are substantially V-shaped and extend into the second end walls 64 and 66. The second grooves 74 and 76 comprise inside cutting edges 74A and 76A and outside cutting edges 74B and 76B. The grooves 74 and 76 are aligned relative to one another on second end walls 64 and 66 in a manner similar to the first member 21. An aperture 52 within second base 32 receives machine screws 53 to adjustably secure the first member 21 to the second member 22.

Figure 7:
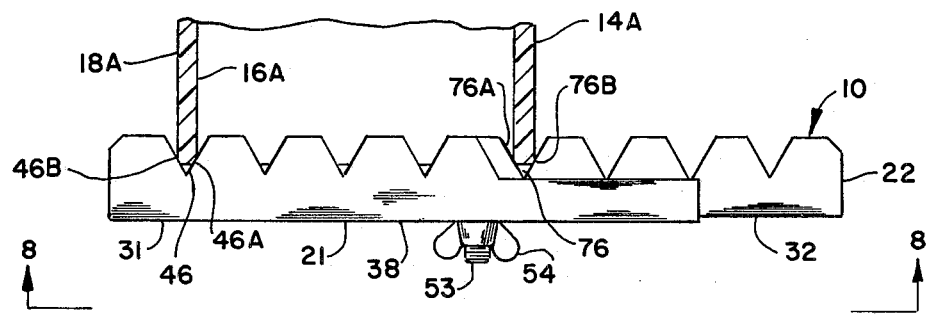
FIG. 7 is a side sectional view of the device shown in FIGS. 1-6 finishing the inside tubing surface and the outside tubing surface of a small tubing.
Figure 8:
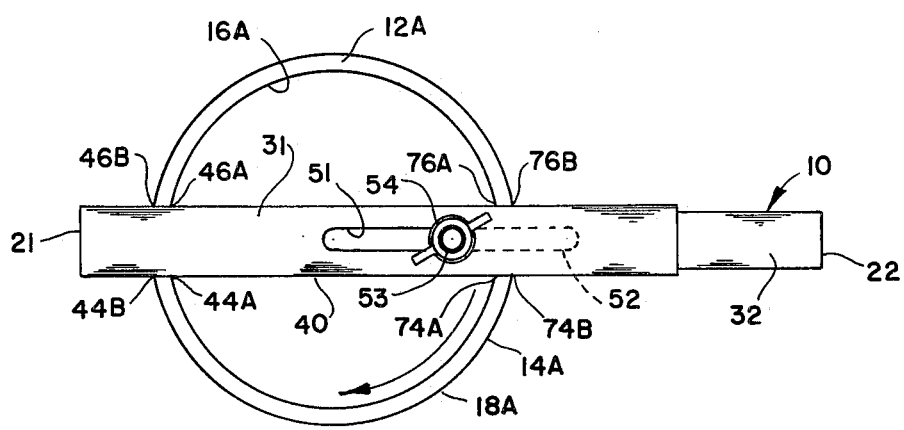
FIG. 8 is a bottom view of FIG. 7 illustrating the device finishing the end of the tubing.
Figure 9:
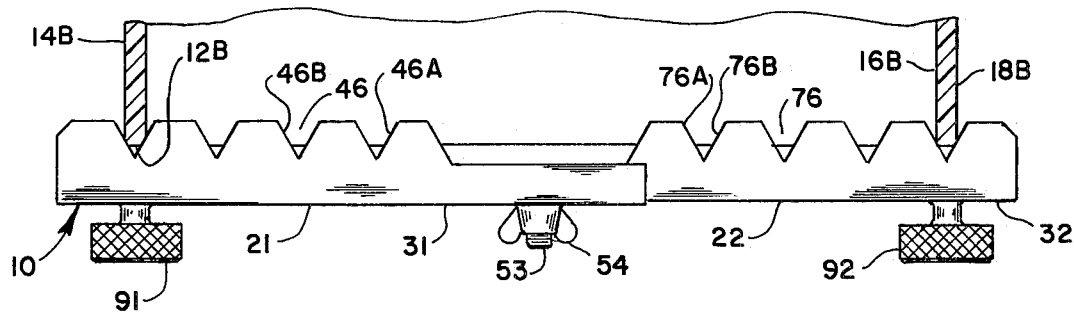
FIG. 9 is a side sectional view similar to that shown in FIG. 7 illustrating a second embodiment finishing the inside and the outside tubing surfaces of a large tubing.

FIGS. 7–9 illustrate the operation of the device 10 in association with the tubing 14. In FIGS. 7 and 8, a small tubing 14A is finished by the device 10. The first and second members 21 and 22 are moved into a contracted position to accommodate for the small diameter tubing 14A. FIG. 7 shows the inside cutting edges 46A and 76A finishing the inside surface 16A of the tubing 14A while the outside cutting edges 46B and 76B are finishing the outside tubing surface 18A. This finishing occurs upon rotation of the device 10 relative to the tubing 14 as indicated by the arrows in FIGS. 1 and 8.

FIG. 8 illustrates the total finishing of the tubing 14A wherein the inside cutting edges 44A, 46A, 74A and 76A simultaneously finish the inside tubing surface 16A while the outside cutting edges 44B, 46B, 74B, and 76B finish the outside tubing surface 18A. The grooves 44, 46, 74 and 76 are substantially V-shaped, to accommodate a wide variety of tubing wall thicknesses. The first and second members 21 and 22 are relatively movable to accommodate for a large variety of tubing diameters. The minimum tubing diameter suitable for use with the instant invention is determined by the spacing between the adjacent grooves, such as 46 or 76, of either of the first or second members 21 or 22.

FIG. 9 illustrates a second embodiment of the device 10A finishing a large diameter tubing 14B where the first and second members 21 and 22 are shown extended. The device 10A includes first and second handles 91 and 92, respectively, secured to the first and second members 21 and 22 for facilitating rotation of the device 10A relative to the tubing 14.

In operation, wing nut 54 is unloosened and the first and second members 21 and 22 are adjusted until a pair of grooves of the first member 21 receives one side of the tubing 14B while a pair of grooves of the second member 22 receives the other side of the tubing with the device 10A extending across the diameter of the tubing 14B. Upon establishing this relationship, the wing nut 54 is tightened for securing the first and second members 21 and 22 relative to one another. Appropriate force is then applied to the device 10A for finishing the inside and outside tubing surfaces 16B and 18B. It should also be appreciated that a spacer bar may be incorporated between the first and second members 21 and 22 to further extend the capacity of the device 10. This variation is within the contemplation of the invention.

The foregoing has described a device made from two stamped metallic members, each having plural bends and secured relative to one another by a simple threaded fastener. The device as disclosed in suitable for use with plastic or synthetic tubing or conduit. It should be appreciated that the principles disclosed herein are equally adaptable to use on harder materials such as steel and aluminum with hardened cutting edges being applied to the grooves within the first and second members 21 and 22.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention.

I claim:

1. A device for finishing the end of a tubing, the tubing having an inside tubing surface and an outside tubing surface, comprising in combination:
    a first member having first groove means defining an inside cutting edge and an outside cutting edge;
    said inside and outside cutting edges of said first member being fixed in position in said first member with at least a portion of said inside cutting edge forming an acute angle with at least a portion of said outside cutting edge;
    a second member having second groove means defining an inside cutting edge and an outside cutting edge;
    said inside and outside cutting edges of said second member being fixed in position in said second member with at least a portion of said inside cutting edge forming an acute angle with at least a portion of said outside cutting edge; and
    connecting means for adjustably connecting said first member to said second member enabling said inside and outside cutting edges of said first and second members to respectively finish the inside and the outside tubing surfaces of the tubing end upon rotation of said first and second members relative to the tubing.

2. A device as set forth in claim 1, wherein each of said first and second groove means comprises a substantially V-shaped groove.

3. A device as set forth in claim 1, wherein said first groove means comprises a plurality of grooves each having an inside and an outside cutting edge.

4. A device as set forth in claim 3, wherein said plurality of grooves are spaced relative to one another along the longitudinal length of said first member.

5. A device as set forth in claim 1, wherein said connecting means includes aperture means in each of said first and second members; and threaded fastening means extending through said aperture means for securing said first member relative to said second member.

6. A device as set forth in claim 5, wherein said aperture means in said first member comprises a slot extending along the longitudinal length of said first member.

7. A device as set forth in claim 1, wherein said first member comprises a first base and a first end wall extending substantially perpendicular to said first base from each of two opposite ends of said first base; and said first groove means including a groove extending into each of said first end walls enabling said first member to finish the inside and the outside tubing surfaces with two separate inside cutting edges and two separate outside cutting edges.

8. A device as set forth in claim 7, wherein said second member comprises a second base and a second end wall extending substantially perpendicular to said second base from each of two opposite ends of said second base; and said second groove means including a groove extending into each of said second end walls enabling said second member to finish the inside and the outside tubing surfaces with two separate inside cutting edges and two separate outside cutting edges.

9. A device as set forth in claim 8, wherein said second member is receivable within said first member enabling said second base and said second end walls to slidably contact said first base and said first end walls, respectively.

10. A device as set forth in claim 9, wherein said connecting means comprises a first slot in said first base and a second slot in said second base; and threaded fastening means extending through said first and second slots for adjustably securing said first member to said second member.

11. A device as set forth in claim 10, wherein said first end walls extend only partially along the longitudinal length of said first member;

said second end walls extend only partially along the longitudinal length of said second member; and said first and second slots respectively located adjacent said first and second members void of said first and second end walls.

12. A device as set forth in claim 1, wherein each of said first and second members comprises a base and end walls extending substantially perpendicular from each of two opposite ends of said base forming a generally U-shaped cross-section; and said U-shaped second member being receivable within said U-shaped first member enabling said bases to slidably engage one another.

13. A device for finishing the end of a tubing, the tubing having an inside tubing surface and an outside tubing surface, comprising in combination:

a first member having a generally U-shaped cross-section including a first base and first end walls extending substantially perpendicular to said first base from each of two opposed ends of said first base;

a plurality of first grooves extending into each of said first end walls and being spaced along the longitudinal length of said first member;

said first grooves having an inside and an outside cutting edge with the groove of the first end walls being aligned relative to one another;

at least a portion of said inside cutting edge forming an angle with at least a portion of said outside cutting edge of said first member;

a second member having a generally U-shaped cross-section including a second base and second end walls extending substantially perpendicular to said second base from each of two opposed ends of said second base;

a plurality of second grooves extending into each of said second end walls and being spaced along the longitudinal length of said second member;

said second grooves having an inside and outside cutting edge with the grooves of the second end walls being aligned relative to one another;

at least a portion of said inside cutting edge forming an angle with at least a portion of said outside cutting edge of said second member;

said U-shaped second member being receivable in the U-shaped first member enabling said first base and said first end walls to slidably contact said second base and said second end walls respectively;

aperture means in said first and second bases of said first and second members, and connecting means extending through said aperture of said first and second members to adjustably connect said first member to said second member for enabling said first member to finish the inside and the outside tubing surfaces with two separate inside cutting edges and two separate outside cutting edges and for simultaneously enabling said second member to finish the inside and the outside tubing surface with two separate inside cutting edges and two separate outside cutting edges upon rotation of said first and second member relative to the tubing.

* * * * *